United States Patent [19]

Bieler

[11] 4,094,956

[45] June 13, 1978

[54] METHOD OF REDUCING THE SODIUM SULFATE CONTENT OF HALITE

[75] Inventor: Barrie H. Bieler, Walnut Creek, Calif.

[73] Assignee: The Dow Chemical Company, Midland, Mich.

[21] Appl. No.: 824,006

[22] Filed: Aug. 12, 1977

[51] Int. Cl.$^2$ .......................... C01D 3/04; C01D 3/14; C01D 5/00
[52] U.S. Cl. .................................. 423/179; 423/184; 423/499; 423/551
[58] Field of Search .................. 423/499, 55, 179, 184

[56] References Cited

U.S. PATENT DOCUMENTS

| 1,909,606 | 5/1933 | Berliner | 423/551 X |
| 3,712,797 | 1/1973 | Winkler | 423/499 |
| 3,832,446 | 8/1974 | Mitchell et al. | 423/499 X |

FOREIGN PATENT DOCUMENTS 1,167,999  10/1969  United Kingdom ................. 423/499

OTHER PUBLICATIONS

Chem. Abstracts, vol. 79, 1973, p. 137, 55544S.
Turk, L., Ph.D. Thesis, Stanford Univ., 1969, pp. 204-206, Hydrology of the Bonneville Salt Flats, Utah.
Sarig et al. Purification of Alkali Halides by Means of Fractional Crystallization from Aqueous Solutions; Chem. Abs. 78, 142068v.

*Primary Examiner*—Edward Stern

[57] ABSTRACT

The content of sodium sulfate (and less soluble sulfates) in rock salt (halite) can economically be reduced from levels as high as 5 weight percent to levels as low as about 0.1 weight percent by the process of the invention. The halite is crushed to a certain particle size range and particles less than 0.5 mm in effective diameter are removed while (or after) the crushed material is subjected to attrition washing with a low sulfate, high NaCl brine. The washed, coarse particles are rinsed with a low sulfate brine, drained and dried to an extent appropriate to their contemplated use.

10 Claims, No Drawings

METHOD OF REDUCING THE SODIUM SULFATE CONTENT OF HALITE

BACKGROUND OF THE INVENTION

The demand for sodium chloride of electrolytic cell quality is increasing. Plants which consume large amounts of this commodity necessarily have relied on supply sources which are not so distant that high shipping costs must be borne. However, not all such supply operations can be expanded to meet increasing demands for cell quality salt. Thus, for example, there may not be room to build additional solar evaporation ponds in an area which has been developed for other purposes around an established evaporation facility. Or, as another example, environmental considerations may rule out disposal of increased amounts of bitterns, mining spoils, etc. in the vicinity of a given salt processing operation.

Consequently, it is becoming increasingly necessary to consider utilizing extant salt bodies which do not meet electrolytic cell requirements but which can be upgraded and are located in areas subject to less constraints. Such deposits are generally more remote from electrochemical plants and their utilization necessarily entails greater freighting costs. It is then essential to devise a minimally expensive method of upgrading the raw salt obtained from these lower purity deposits.

Exemplary of existing impure salt bodies of considerable volume are those which have been deposited in primary evaporation ponds, adjacent to the western edge of the Great Salt Lake Basin, Utah, during processing of local brines for potassium chloride recovery. These deposits have sulfate ion contents of from about 0.6% to 1.2% by weight, as compared to typical sulfate contents of 0.15 to 0.3% for salt produced by evaporation of sea water. In view of the distance of these deposits from the majority of potential consumers, a cheap method of sulfate removal is imperative to their utilization.

Such references to NaCl purification as have been found in the literature are concerned with processes, such as fractional crystallization or selective precipitation, which are carried out on salt solutions. The most commonly employed method of removing dissolved sulfate is by calcium chloride addition to precipitate it as calcium sulfate. Application of this method to millions of tons of solid salt would require corresponding amounts of both water and calcium chloride. Extensive new evaporation ponds or a considerable expenditure of energy for subsequent water removal would also be required. Consequently, this method, and other solution processes - which would have similar requirements, are not attractive. Thus, a need for an efficient and economical method of reducing the sulfate contents of high sulfate salt deposits is evident.

OBJECTS OF THE INVENTION

The primary object of the present invention is to provide an efficient and economic method of recovering sodium chloride of substantially reduced sulfate contents from high sulfate salt bodies.

A particular object is to recover sodium chloride of electrolytic cell feed quality from natural or man made salt deposits containing too much sulfate to be directly useable in the manufacture of chlorine and NaOH by electrolysis.

A further object is to provide a method of removing sodium sulfate from high sulfate salt (NaCl) which does not entail substantial dissolution of the salt or result in the production of large amounts of calcium sulfate (gypsum).

Another object is to provide a process for refining high sulfate salt (NaCl) which is essentially mechanical in nature, does not involve delicate solubility equilibria or chemical reactions and is effective in separating such dirt or clay particles as may be associated with the raw salt.

An additional object is to provide a method of lowering the sulfate content of sodium chloride crystal aggregates which is uncomplicated.

Yet another object is to provide a process for purifying sulfate contaminated sodium chloride.

Still other objects will be made apparent to those skilled in the art by the following specifications and claims.

SUMMARY OF THE INVENTION

The present invention is a method for reducing the sulfate contents of halites — the latter term being employed herein to include not only naturally formed sodium chloride deposits but man made salt bodies of generally similar characteristics as well.

In qualitative terms, the invention may be defined as the method of reducing the sulfate content of raw aggregates of sodium chloride crystals which comprises crushing the aggregate particles to a size range such that the average particle size approximates the size of the individual NaCl crystals present therein, loosening embedded sulfate micro-particles by attrition-washing, removing those particles smaller than the individual NaCl crystals and separating the crystals from the wash liquor.

More precisely, the invention is defined as a method of reducing the sulfate content of halite, said method comprising:

a. providing pieces of halite which have effective diameters greater than about 2.5 millimeters and are aggregates of sodium chloride crystals, said aggregates containing from about 1 to about 20 volume percent of saturated sodium chloride brine and from about 0.5 to 5.0 weight percent of sulfate bodies which have effective diameters less than about 0.5 millimeters and are embedded in or between said crystals, b. crushing said halite pieces and converting said aggregates to crystalline sodium chloride particles, all of which have effective diameters less than 2.5 millimeters and not more than 30 weight percent of which have diameters of less than 0.4 millimeters, thereby exposing a major proportion of said sulfate bodies, c. attrition-washing said particles by agitating them with a washing brine which is about 80% or more saturated with sodium chloride and contains less than an amount of sulfate as specified below, said agitation being of such character and intensity that said particles make contact with each other and, as a consequence, a major proportion of said exposed bodies are dislodged from said surfaces, d. separating those sodium chloride particles larger than 0.5 millimeter in effective diameter from said brine, and from the dislodged sulfate bodies, the dissolved sulfate contents of said washing brine and the amount thereof retained on said larger particles, after said separation, being controlled so that the amount of sulfates added to said particles by the retained washing brine is about 0.05 weight percent or less of their sodium chloride content.

Preferably, the separated particles (NaCl crystals) are rinsed in a further operation, with a sodium chloride brine containing 1 weight percentage or less of dissolved $Na_2SO_4$.

DETAILED DESCRIPTION

The halite deposits referred to earlier herein, as a by-product of KCl recovery from brines in the Great Salt Lake Basin, may be considered as having been formed under conditions generally typical for formation of halite strata. The original source brine is present in a near-surface "aquifer" underlying the solid surface materials ("salt flats"). It is gathered by an array of trenches cut to a depth of about 18 feet (~ 6 meters) and conveyed thereby to primary evaporation ponds. The KCL content of the brine is increased several fold by evaporation in the primary ponds, with concurrent deposition of halite deposits, and then passed to secondary or "ripening" ponds for further concentration. The contents of the major components in the halite deposits vary with depth and also from one deposit to another. However, the following ranges are representative: NaCl, 92–96 wt.%; KCL, 0.4–0.7; $Na_2SO_4$, 0.6–2.3; $Ca^{2+}$, 0.2–0.3 and $Mg^{2+}$, 0.1–0.15 wt.%.

Most of the calcium and magnesium content is present as chlorides; the sulfates of these metals are much less soluble than sodium sulfate and will largely have precipitated prior to deposition of halite strata. Thus, although the unqualified term "sulfates" is used herein to included both alkali and alkaline earth metal sulfates, limiting contents can conveniently be expressed simply in terms of sodium sulfate.

Non-salt solids, such as clay or wind-blown gypsum or dirt may also be present to the extent of about 0.1%. In addition, water (as trapped and/or adsorbed, saturated mother liquor) is generally present to the extent of from about 2 to about 9 weight percent. Higher contents of brine, up to about 20 weight percent, may be present and these (or even higher) amounts can be accomodated, without intolerably detrimental effects, in halites to be upgraded by the process of the invention.

It has been found by microscopic examination that the foregoing halite deposits consist of aggregated sodium chloride crystals, various solid impurities and inclusions or occlusions of saturated brine. They are readily mined as chunks of crystalline sodium chloride consisting predominantly of aggregated monocrystals. The monocrystals have effective diameters of about 0.4–0.5 mm and interlock to form particles ranging from about 1 to about 20 mm in effective diameters. (by the term "effective diameter" is meant the maximum dimension of the smallest screen opening the particle will pass through.)

A major proportion of the sulfate impurities in the foregoing halite particles is present as inclusions in the outer 10–20% of the volume of the monocrystals. It is believed that the conditions of evaporation under which most natural halites were laid down were not greatly different than those under which the foregoing deposits were formed. Also, no reason is apparent why the compositions of the natural source brine would have been so different as to significantly counteract the indicated tendency of the less soluble NaCl to exclude $Na_2SO_4$ from the developing crystal structure. Accordingly, the geometrical pattern of distribution of occluded sodium sulfate observed for the foregoing halite deposits is believed to be representative of halites in general.

The sulfate impurities present are predominantly sodium sulfate and include substantially lower amounts of other alkali metal sulfates, such as potassium sulfate, and much smaller amounts of alkaline earth metal sulfates ($Ca^{2+}$, $Mg^{2+}$, etc.). These sulfates are distributed in the (poly) crystalline NaCl particles largely as solid bodies, less than about 0.5 millimeter in effective diameter, embedded in or between the component monocrystals. Those crystals in which sulfate bodies are embedded tend to fracture along planes passing through them.

It has been found that a high proportion of the sulfate bodies can be exposed (at the surfaces of the resulting crystalline NaCl particles) if the halite pieces are crushed to such an extent that all of the particles produced are less than about 2.5 mm in effective diameter, but not more than about 30 weight percent (preferrable none) of the particles have effective diameters less than about 0.4 mm.

Since the process of the present invention comprises crushing the raw halite to size, there is no upper limit on the size of the halite pieces to be processed. If necessary, the crushing step may include a preliminary operation in which the largest particles (chunks) are broken up, as by sledging, tumbling or by passage through a jaw crusher.

The overall crushing operation is intended to reduce the size of the halite particles to such a degree that most of the sulfate impurities will be exposed but with minimum breakage of the individual sodium chloride monocrystals.

It is of course possible to crush the halite to such an extent that essentially all of the sulfate inclusions will be liberated, without resorting to attrition washing. However, this will occasion the result that a high proportion of the NaCl crystals will be reduced to fragments so small that they cannot readily be separated from the free sulfate bodies. That is, a separation according to particle size will then not be feasible.

Any suitable crushing, grinding or impacting means may be employed but the combination of primary and secondary roll crushers set at nips of ½ inch and ⅛ inch (127 and 32 mm respectively) is considered particularly suitable.

Attrition-wash is primarily intended to accomplish disengagement of the sulfate bodies exposed by deaggregating (and fracturing) the component crystals which made up the halite pieces.

The attrition-wash also permits the fines (the liberated sulfate bodies and NaCl crystals or fragments less than about 0.5 mm in effective diameter) to be removed during the same operation. Although not essential, this mode of fines separation is preferred as being both convenient and efficient.

Attrition washing is additionally beneficial in obviating handling difficulties caused by agglomeration of the fines by the brine liberated from liquid inclusions during crushing.

The attrition-wash may be carried out in any suitable apparatus and is accomplished by agitating the crushed material with a sodium chloride brine which is at least about 80% saturated and contains about 1 weight percent or less of dissolved sulfates. The amount of brine employed is at least such that the requisite agitation can be carried out without excessive power consumption and/or breakage of monocrystals. The agitation is at least sufficient to ensure effective contact of the particles of halite with each other, and this ordinarily will also entail contact of the particles with those solid surfaces defining the zone in which the operation is being carried out.

Removal of sulfate is accomplished primarily as a mechanical separation of particles according to size. That is, most of the sodium sulfate is present in the halite particles as fine particles of undissolved solid, although some is also present as a solute in whatever brine is associated with the particles. Thus, dissolution of a substantial proportion of the sodium sulfate impurity (or of less soluble sulfates) is not necessary. The function of the washing brine is to convey kinetic energy to the particles and to carry the fines to a locus where they may be separated (concurrently or subsequently) from the coarser materials.

The ratio of surface area to volume of the NaCl monocrystals is not high and it is possible (by centrifuging) to reduce the entrained brine content of the product crystals to about 5 weight percent. For the foregoing reasons, it is then feasible to employ for the attrition wash (and for subsequent rinsing) a brine containing as much as about 1 weight percent of dissolved sulfates.

Inclusion of a 1% sodium sulfate brine, in an amount such as to constitute 5 weight percent of the wet salt crystals, will - regardless of the degree of drying subsequently attained - result in back-contamination of the NaCl with sodium sulfate in a weight ratio of 0.05 grams $Na_2SO_4$ added per 95 grams of NaCl, or about 0.053%. This is a substantial but tolerable level of back-contamination in a process employed to reduce sulfate contents to values as low as about 0.1 weight percent.

If the product crystals contain as much as about 20 weight percent of entrained brine, the sulfate content of the brine must have a correspondingly lower valve ($\sim$ 0.2%) in order to hold the sulfate back-contamination at a reasonably low level. i.e., to establish a ratio of 0.04 grams of $Na_2SO_4$ added per 80 grams of NaCl, or 0.05%.

The unconcentrated (but nearly saturated) NaCl source brines from which the above discussed halite deposits were formed contain about 0.75 weight percent of $Na_2SO_4$ and therefore are exemplary of "connate" brines which may be employed in the attrition-washing (or rinsing) steps of the process, provided that the proportion of the brine entrained in the product crystals is lowered to such as degree that the added sulfate does not constitute more than about 0.05 weight percent of the sodium chloride content of the product crystals.

For the specific case of a brine containing 0.75% $Na_2SO_4$, the brine content of the crystals would have to be about 6.3 weight percent or less in order to avoid exceeding the 0.05% level of back-contamination. The latter degree of brine retention is lower than that generally attainable by simple gravity drainage. Accordingly, dilution of the source brine with water or a lower-sulfate brine will be necessary when it is to be used in an operation wherein ordinary gravity drainage is practiced.

The brine employed in the attrition wash should contain about 80% or more of the amount of sodium chloride required to saturate it. The NaCl particles dissolve relative slowly in a brine which is already 80% saturated and an intolerable loss of salt by dissolution will generally not occur at this degree of saturation. Levels of saturation greater than 85% are preferred, but the optimum level for processing of a given halite will not necessarily be 100% of saturation. In some cases, a substantially higher degree of sulfate liberation will result if the crystal surfaces in which the sulfate bodies are embedded is corroded to some extent by NaCl dissolution during attrition-washing. The optimum NaCl content of the brine to be employed for any particular halite can readily be determined in a laboratory scale experiment, such as is described subsequently herein.

The brine employed for rinsing preferably is at least 80% saturated with NaCl. However, since the specific surface of the "coarse" salt particles is not high and only minimal contact duration is necessary in the rinsng step, the rinse brine does not necessarily have to contain any NaCl. Any otherwise suitable brine (or water) which does not contain more than a total of about 1 weight percent of dissolved sulfates can be used as a rinse. Ideally, the rinse brine is saturated in NaCl and contains a total of 0.2 weight percent or less of other solutes.

Although it will usually be advantageous to rinse the attrition-washed NaCl particles, this is not invariably essential.

It accordance with well known priciples, it will often be advantageous, when rinsing is practiced, to employ the rinsing effluent (drained from the rinsed crystals) for attrition-washing a following portion of crushed halite.

Those skilled in the art will recognize that an alternative to fines removal during attrition-washing is to effect their removal subsequently, as during a rinsing operation.

Any suitable apparatus can be employed to carry out the washing and rinsing operations. Thus, such diverse equipment as spiral classifiers, combinations of circulating pumps and screens or stirred vessels of downwardly tapering cross section containing bottom drain valves and appropriately located screens, may be used, Alternatively, such well known means as screen/bowl centrifuges, leaf and frame filters or rotary filters (with filter screens of appropriate mesh), can readily be adapted in operation to the practice of the invention. Still other separation modes (such as decantation or elutriation, for example) will be apparent to those skilled in the art, as will the apparatus required in such modes.

The extent to which the (fines-free) product crystals should be "dewatered" after rinsing (or attrition-washing) depends on the content of sulfate (and other impurities) in the entrained brine and on the balance between the cost of shipping water with the processed halite versus the cost of more complete drainage (and subsequent drying operations). In general, drainage by means other than gravity will entail substantial capital investment and operating costs (as will provision for more complete drying than is attainable simply by exposing the product crystals to ambient air). Ordinarily, simple gravity drainage would not be expected to reduce the brine content of the processed halite below about 20 weight percent. Of course, if centrifugal means are used for separation the wash (or rinse) liquid from the product crystals, more complete drainage can be attained without setting up a separate operation for that purpose.

Simple gravity drainage is relatively slow and imposes somewhat larger operating area requirements. However, it is the most economical dewatering method and is therefore preferred, except when the brine to be drained off has a relatively high sulfate content.

The following example is for purposes of illustration and is not to be construed as limiting the scope of the present invention in a manner inconsistent with the claims appended with these specifications.

EXAMPLE

The screen mesh numbers given in the following example are for U.S. Standard Sieves. The corresponding effective diameters (in mm) of particles just small enough to pass through screens of successively higher mesh numbers are listed below.

| Screen mesh, Openings per inch | 4 | 8 | 10 | 12 | 16 | 35 | 60 |
| --- | --- | --- | --- | --- | --- | --- | --- |
| Size of openings; inches. | 0.187 | 0.094 | 0.079 | 0.066 | 0.047 | 0.020 | 0.0098 |
| Maximum passing particle diam.; mm. | 4.75 | 2.36 | 2.00 | 1.70 | 1.18 | 0.50 | 0.25 |

A laboratory attrition washer was made by cutting the top off of a 500 ml separatory funnel (resultant opening ~ 5 cm in diameter) and cementing the periphery of a circular disc of 35 mesh U.S. Standard screen to the walls of the funnel at a level about half-way between the mouth and the stopcock. A small propeller-type stirrer blade was mounted at the end of a shaft driven by a variable speed motor and extending into the funnel about ⅔ of the distance to the screen.

The washing brine was prepared by saturated deionized water (at about 25° C) with some of the same (representative) primary pond salt (halite) which was to be processed. In two tests, this brine was diluted to 90% saturation.

Each of five essentially identical "splits" of halite (from primary evaporation pond deposits, Great Salt Lake Basin: see "Background") was dried under a heat lamp and subjected to just sufficient crushing, with a mortar and pestle, so that all particles would pass through a 4, 8, or 12 mesh U.S. Standard Sieve. Intermediate cuts of the crushed material were retained on either a 16 or 35 mesh sieve.

A 50 gram sample of one of the intermediate cuts and 250 ml of the washing brine were introduced to the funnel (stopcock closed) and the propeller speed adjusted until the salt particles were moving across the screen actively enough to make frequent and relatively energetic contact with each other. Stirring was continued for two minutes, then the stopcock was opened to permit brine and the fines (the particles which had passed through the screen) to run out. Stirring was discontinued when the brine level dropped to the level of the stirrer blade. The wet, "coarse" salt crystals above the screen were dumped out onto an 8 inch diameter, 42 mesh U.S. Standard sieve screen, sampled for analysis and washed with a spray of brackish water (25 ml) containing 0.02 weight percent of sulfate and a total of 0.6% of dissolved solids. The product crystals were dried in an evaporating dish, weighed and sampled for sulfate analysis.

Two otherwise essentially identical runs were made (with −8+35 mesh crushed halite cuts) in which the periods of attrition-washing were 0.5 and 5 minutes.

The effects of particle size range in the crushed halite on product crystal yield (recovery) and sulfate content are apparent from the data in Table 1. The effects of varying the duration of the attrition-washing are evident from Table 2. The effects of spray washing are apparent from both tables.

TABLE 1
Effect of Particle Size Range on Yield and Sulfate Content of NaCl Recovered From Crushed and Attrition-Washed Halite (Initially containing 0.8% Na$_2$SO$_4$).

| Particle Size Range | −4+16 | −8+16[3] | −8+16[3] | −8+35 | −12+35 |
| --- | --- | --- | --- | --- | --- |
| Wt.% Sulfate[1] in Product | | | | | |
| Before spray wash | 0.40 | 0.40 | 0.35 | 0.50 | 0.29 |
| After spray wash | 0.40 | 0.20 | 0.22 | 0.33 | 0.29 |
| NaCl Recovery from: | | | | | |
| Uncrushed halite | 63% | 56% | 51% | 79% | 66% |
| Crushed cut | 76 | n.d.[2] | 90 | 91 | 92% |

Notes:
[1] (SO$_4$)$^{2-}$, determined by gravimetric analysis.
[2] Not determined.
[3] Washing brine only 90% saturated in NaCl.

TABLE 2
Effect of Duration of Attrition-Washing on Sulfate Content and Yield of NaCl Product

| Attrition-Wash Duration, minutes | 0.5 | 2.0 | 5.0 |
| --- | --- | --- | --- |
| Wt.% Sulfate[1] in Product | | | |
| Before attrit. wash | 0.84 | 0.75 | 0.86 |
| Before spray wash | 0.55 | 0.50 | 0.30 |
| After spray wash | 0.45 | 0.33 | 0.28 |
| NaCl Recovery[2] | | | |
| After spray wash | 91% | 90% | 84% |

Notes:
[1] (SO$_4$)$^{2-}$, determined by gravimetric analysis.
[2] From crushed cut.

On the basis of the data in the foregoing tables, a reasonable compromise between high NaCl recovery and low sulfate contents in the recovered product would appear to be achievable by maximizing the proportion of the halite pieces converted to −8+35 mesh material and attrition-washing for about 2 to 4 minutes. It is also evident that rinsing is essential if it is desired to attain minimal sulfate contents in the product crystals.

Althrough any suitable drying method may be employed to reduce the moisture content of the NaCl product, the most economical, and therefore the most preferred, method is by simple evaporation from windrows exposed to the atmosphere and warmed by sunlight. However, where the requisite heat can be provided at a tolerable cost, as by waste process steam, solar heating, wind generators or combustion of organic wastes, resort may be had to forced circulation of heated air over windrows (in appropriate sheds) or in rotary driers.

What is claimed is:

1. The method of reducing the sulfate content of a halite, which comprises:
    (a) providing pieces of halite which have effective diameters greater than about 2.5 millimeters and are aggregates of sodium chloride crystals, said aggregates containing from about 1 to about 20 volume percent of saturated sodium chloride brine and from about 0.5 to 5.0 weight percent of sulfate bodies which have effective diameters less than about 0.5 millimeters and are embedded in or between said crystals,
    (b) crushing said halite pieces and converting said aggregates to crystalline sodium chloride particles, all of which have effective diameters less than 2.5 millimeters and not more than 30 weight percent of which have diameters of less than 0.4 millimeters, thereby exposing a major proportion of said sulfate bodies, (c) attrition-washing said particles by agitating them with a washing brine which is about 80% or more saturated with sodium chloride and contains less than an amount of sulfate as specified below, said agitation being of such character and intensity that said particles make contact with each other and, as a consequence, a major proportion of said exposed bodies are dislodged from said surfaces, (d) separating those sodium chloride particles larger than 0.5 millimeter in effective diameter from said brine, and from the dislodged sulfate bodies, the dissolved sulfate content of said washing brine and the amount thereof retained on said larger particles, after said separation, being controlled so that the amount of sulfates added to said particles by the retained washing brine is about 0.05 weight percent or less of their sodium chloride content.

2. The method of claim 1 wherein said larger particles, after being washed and separated from said washing brine, are rinsed with and separated from a rinsing brine, the sulfate content of the latter brine and the amount of it retained on the rinsed particles being controlled so that the amount of sodium sulfate added to said particles by the retained brine is about 0.05 weight percent or less of their sodium chloride content.

3. The method of claim 1 wherein said crushing is carried out in such manner as to maximize the proportion of $-8+35$ mesh material in the crushed halite and said particles are attrition-washed for a period of from about 2 to about 4 minutes.

4. The method of claim 1 wherein said dislodged sulfate bodies are separated from said sodium chloride particles having effective diameters greater than about 0.5 mm during said attrition-washing operation.

5. The method of claim 1 wherein said washing brine contains 0.2 weight percent or less of dissolved sulfates.

6. The method of claim 2 wherein said rinsing brine contains a total of 0.2 weight percent or less of solutes other than sodium chloride.

7. The method of claim 2 wherein said rinsing brine is saturated in sodium chloride.

8. The method of claim 6 wherein said rinsing brine is saturated in sodium chloride.

9. The method of claim 2 wherein said rinsing brine is more than 85% but less than 100% saturated in sodium chloride.

10. The method of claim 3 wherein said dislodged sulfate bodies are separated from said sodium chloride particles having effective diameters greater than about 0.5 mm during said attrition-washing operation and said larger particles are rinsed with a brine which is about 80% or more saturated in sodium chloride and contains a total of about 0.2 weight percent or less of other solutes.

* * * * *